(12) United States Patent
Zhang et al.

(10) Patent No.: US 10,936,193 B2
(45) Date of Patent: Mar. 2, 2021

(54) METHOD AND DEVICE FOR STORAGE MANAGEMENT

(71) Applicant: EMC IP Holding Company LLC, Hopkinton, MA (US)

(72) Inventors: Bob Bo Zhang, Beijing (CN); Vivian Wenwen Gao, Beijing (CN); Yu Cao, Beijing (CN); Steven Ming Li, Beijing (CN); Grace Yan Cui, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 15/461,753

(22) Filed: Mar. 17, 2017

(65) Prior Publication Data
US 2017/0269846 A1    Sep. 21, 2017

(30) Foreign Application Priority Data

Mar. 17, 2016 (CN) .......................... 201610154144.1

(51) Int. Cl.
*G06F 12/00* (2006.01)
*G06F 3/06* (2006.01)

(52) U.S. Cl.
CPC ............ *G06F 3/0605* (2013.01); *G06F 3/067* (2013.01); *G06F 3/0644* (2013.01); *G06F 3/0689* (2013.01)

(58) Field of Classification Search
CPC ...... G06F 3/0605; G06F 3/0644; G06F 3/067; G06F 3/0689
See application file for complete search history.

(56) References Cited

U.S. PATENT DOCUMENTS

| 5,894,485 A * | 4/1999 | Halligan ............... G06F 3/0623 714/807 |
| 6,041,394 A * | 3/2000 | Halligan ............... G06F 3/0623 711/114 |
| 6,343,324 B1 * | 1/2002 | Hubis .................. G06F 3/0622 709/229 |
| 7,313,719 B1 * | 12/2007 | Elahee ................ G06F 11/1464 711/114 |

(Continued)

FOREIGN PATENT DOCUMENTS

| CN | 101840308 | 9/2010 |
| CN | 101997919 | 3/2011 |

(Continued)

OTHER PUBLICATIONS

Second Chinese Office Action (with English translation) dated Sep. 29, 2019 by The Patent Office of the People's Republic of China for Application No. 201610154144.1, filed on Mar. 17, 2016, Serial No. 2019092502102370, 23 pages.

*Primary Examiner* — Prasith Thammavong
(74) *Attorney, Agent, or Firm* — BainwoodHuang (57) ABSTRACT

Embodiments of the present disclosure provide a method and device for storage management. The method comprises: receiving from a host a storage creating request which specifies a target capacity expected by the host creating for the host a first group of logical units having the target capacity; associating the first croup of logical units with physical storage for use by the host; and creating for the host a second group of logical units having a first additional capacity, the second group of logical units being unassociated with the physical storage.

17 Claims, 9 Drawing Sheets

(56) References Cited

U.S. PATENT DOCUMENTS

| | | | |
|---|---|---|---|
| 7,328,287 B1* | 2/2008 | Arumugham | G06F 3/0605 709/203 |
| 7,974,953 B1* | 7/2011 | Surla | G06F 16/128 707/663 |
| 8,069,322 B2* | 11/2011 | Sandler | G06F 11/2076 711/162 |
| 8,135,906 B2 | 3/2012 | Wright et al. | |
| 8,412,858 B2* | 4/2013 | Contreras | G06F 3/0605 710/15 |
| 8,806,154 B1* | 8/2014 | Gupta | G06F 3/0644 711/156 |
| 9,043,567 B1* | 5/2015 | Modukuri | G06F 3/0607 711/162 |
| 9,053,002 B2* | 6/2015 | Goodman | G06F 3/0655 |
| 10,025,673 B1* | 7/2018 | Maccanti | G06F 11/1458 |
| 10,324,807 B1* | 6/2019 | Kumar | G06F 3/067 |
| 2004/0083401 A1* | 4/2004 | Furukawa | G06F 11/0784 714/6.32 |
| 2005/0210028 A1* | 9/2005 | Kodama | G06F 3/0623 |
| 2006/0218256 A1* | 9/2006 | Maruyama | G06F 3/0605 709/220 |
| 2008/0010421 A1* | 1/2008 | Chen | G06F 3/0607 711/162 |
| 2009/0204759 A1* | 8/2009 | Seaman | G06F 3/0605 711/114 |
| 2009/0287880 A1* | 11/2009 | Wright | G06F 11/2069 711/114 |
| 2009/0327602 A1* | 12/2009 | Moore | G06F 3/0616 711/114 |
| 2010/0235832 A1* | 9/2010 | Rajagopal | G06F 3/0631 718/1 |
| 2010/0306486 A1* | 12/2010 | Balasubramanian | G06F 11/1458 711/162 |
| 2013/0067187 A1* | 3/2013 | Moss | G06F 3/0689 711/170 |
| 2014/0156960 A1* | 6/2014 | Simoncelli | G06F 21/6218 711/163 |
| 2016/0342609 A1* | 11/2016 | Jibbe | G06F 11/1448 |
| 2017/0046070 A1* | 2/2017 | Sunaga | G06F 3/0631 |
| 2017/0242617 A1* | 8/2017 | Walsh | G06F 3/0673 |

FOREIGN PATENT DOCUMENTS

| | | |
|---|---|---|
| CN | 102096557 | 6/2011 |
| CN | 102123176 A | 7/2011 |
| JP | 2008003857 | 1/2008 |

* cited by examiner

METHOD AND DEVICE FOR STORAGE MANAGEMENT

RELATED APPLICATIONS

This application claim priority than Chinese Patent Application Number CN201610154144.1, filed on Mar. 17, 2016 at the State Intellectual Property Office, China, titled "METHOD AND APPARATUS OF STORAGE MANAGEMENT," the contents of which is herein incorporated by reference in its entirety.

FIELD

Embodiments of the present disclosure generally relate to the technical field of data storage, and more specifically, to a method and device for storage management.

BACKGROUND

With increasing demands on data processing and data applications, the data amount produced in various applications rockets up. In the meantime, importance of storage management has been realized. Data management in a storage system involves not only the management of application layers hut also the management of a storage system itself. On one hand, the data storage system should have a sufficient storage capacity to meet the constantly growing data amount. On the other band, it needs to provide a more optimized storage management technique. For example, with increasing business needs of various applications, the application storage capacity needs to be expanded constantly, which requires the storage system to provide convenient operations for the applications and to enable fast capacity expanding without interrupting the running of the applications.

SUMMARY

In general, embodiments of the present disclosure provide solutions for optimizing storage management in a provisioning manner.

According to a first aspect of the present disclosure, a method of storage management is provided. The method comprises: receiving a storage creating request from a host, the storage creating request specifying a target capacity expected by the host; creating for the host a first group of logical units having the target capacity; associating the first group of logical units with a physical storage for use by the host; and creating for the host a second group of logical units having a first additional capacity exceeding the target capacity, the second group of logical units being unassociated with the physical storage.

In some embodiments, the method further comprises: receiving a storage expanding request from the host, the storage expanding request specifying an expansion capacity expected by the host; and in response to the storage expanding request, expanding the expansion capacity for the host based at least partly on the second group of logical units.

In some embodiments, the expanding comprises: in response to determining that the first additional capacity is greater than or equal to the expansion capacity, selecting, logical units corresponding to the expansion capacity from the second group of logical units; and associating the selected logical units with the physical storage for use by the host.

In some embodiments the expanding comprises: in response to determining that the first additional capacity is less than the expansion capacity, creating for the host a third group of logical units based on a difference between the expansion capacity and the first additional capacity; and associating the third group of logical units with the physical storage for use by the host.

In some embodiments, the expanding further comprises: creating for the host a fourth group of logical units having a second additional capacity exceeding the expansion capacity, the fourth group of logical units being unassociated with the physical storage.

In some embodiments, the method further comprises: receiving a storage removing request from the host; and in response to the removing request involving all logical units that are currently associated with the physical storage, removing the logical units that are currently associated with the physical storage, and removing, from the second group of logical units, logical units being unassociated with the physical storage.

According to a second aspect of the present disclosure, a device of storage management is provided, comprising: at least one processor; and at least one memory including computer program codes, the at least one memory and the computer program codes configured to, with at least one processor, cause the device to perform the following: receiving a storage creating request from a host, the storage creating request specifying a target capacity expected by the host; creating for the host a first: group of logical units having the target capacity; associating the first group of logical units with a physical storage for use by the host; and creating for the host a second group of logical units having a first additional capacity exceeding the target capacity, the second group of logical units being unassociated with the physical storage.

According to a third aspect of the present disclosure, an apparatus of storage management is provided, comprising: a receiving unit configured to receive a storage creating request from the host, the storage creating request specifying a target capacity expected by the host; and a creation unit configured to create for the host a first group of logical units having the target capacity, the first group of logical units being associated with a physical storage for use by the host, and create for the host a second group of logical units having a first additional capacity exceeding the target capacity, the second group of logical units being unassociated with the physical storage.

According to a fourth aspect of the present disclosure, a computer readable storage medium having computer readable program instructions stored thereon is provided, the computer readable program instructions which, when executed on at least one processor, cause the at least one processor to carry out the method according to the first aspect of the present disclosure.

The embodiments of the present disclosure can provide safe and rapid storage capacity expansion. In addition, the provisioned logical units do not occupy physical storage space, thus no storage capacity is wasted.

BRIEF DESCRIPTION OF THE DRAWINGS

Through the following detailed description with reference to the accompanying drawings, the above and other objectives, features, and advantages of example embodiments of the present disclosure will become more apparent. In the drawings, identical or similar reference signs represent identical or similar elements, wherein.

DETAILED DESCRIPTION OF EMBODIMENTS

Embodiments of the present disclosure disclosed herein now be described with reference to the drawings. It will be noted that similar components or functional components in the drawings will be represented by an identical number. The appended drawings are only intended to illustrate the embodiments of the present disclosure. Those skilled in the art may obtain alternative embodiments from the following description without departing from the spirits and the scope of the present disclosure.

As used herein, the term "includes" and its variants are to be read as open-ended terms that mean "includes, but is not limited to". The term "based on" is to be read as "based at least in part on." The term "one example embodiment" and "an example embodiment" are to be read as "at least one example embodiment." The term "another embodiment" is to be read as "at least one other embodiment".

Figure 1:
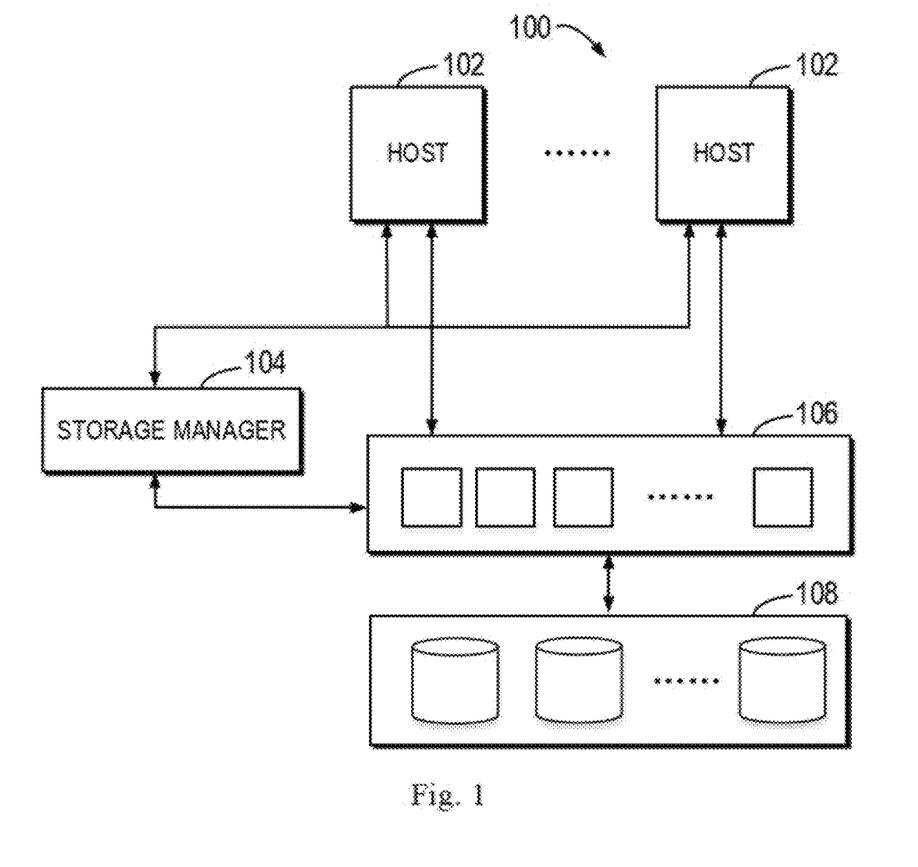
FIG. 1 is a diagram illustrating a storage environment to which an embodiment of the present disclosure may be applied.

FIG. 1 illustrates a storage environment 100 to which an embodiment of the present disclosure may be applied. In some embodiments, the storage environment 100 may be established based on, for example, Storage Area Network (SAN) architecture. As shown therein, the storage environment 100 includes one or more hosts 102, a storage manager 104 and a physical storage 108.

The host 102 may be any appropriate electronic device, which may, under control of the storage manager 104, store data on the physical storage 108. The physical storage 108 may include one or more physical storage devices. The examples of the physical storage devices include, but are not limited to, a Solid State Disk (SSD), Fiber Channel (FC) disk, Serial Advanced Technology Attachment (SATA) disk, Serial Attached Small Computer System Interface (SAS) disk, etc. In some embodiments, the physical storage 108 may be configured as a Redundant Array of Independent Disks (RAID).

The storage manager 104 manages the storage environment 100. In some embodiments, the storage manager 104 may be implemented as a part of an Operating System (OS) or a hypervisor. Particularly, in one embodiment, the storage manager 104 may be implemented as Software Defined Storage (SDS). For example, in the embodiments of the present disclosure, the storage manager 104 may configure and manage the storage devices in the physical storage 108, the host 102, the fiber channel switch (no shown), etc. The fiber channel switch is connected between the host 102 and the physical storage 108 to provide the host 102 with a network accessing capability to the storage devices of the physical storage 108 and a fiber channel switching function, thereby allowing data transmission and data sharing.

The storage manager 104 may, among other things, provide virtual storage to the host 102 based on a physical storage space provided by the physical storage 108. To this end, the storage manager 104 allocates for the host 102 and manages the storage space per a unit of a logical unit. Each logical unit may have a unique Logical Unit Number (LUN). In the context of the present disclosure, the terms "logical unit" and "logical unit number" are exchangeable for discussion. In this way, from the perspective of the host 102, the storage space is a storage pool 106 consisting of LUNs. The host 102 may operate on the data stored, in the physical storage 108 with these LUNs.

In conventional solutions, all LUNs allocated from the storage pool 106 to the host 102 are actually associated or bound with the physical storage 108. In this case, when it is required for a host 102 to expand the capacity of the storage space, new logical unit(s) is created based on the expansion capacity. Thereafter, the created new logical unit(s) is associated with the physical storage of the disk array. The newly created logical unit(s) is added to the existing disk array masking to associate the host 102 with its logical unit(s) and the ports of the disk array. Thus, when accessing the physical storage via the fiber channel switch, the host 102 can correctly identify its logical units. Further, it may be required to modify the existing zones in the switch to implement isolation between devices, to rescan or mount the new logical units on the host 102, to format and use the new logical unit on the host 102, etc.

The above process affects the normal operations of the host 102. For example, a modification to the zones usually occurs on several fiber channel switches, and these switches are shared by a number of hosts and disk arrays. Therefore, changing configuration frequently may cause update failures and configuration errors, affecting the hosts and disk arrays connected to these switches. Meanwhile, changing the masking of the disk array may degrade the Quality of Service (QoS) of the applications being running. In order to avoid such problems, it has to resort to human users to check the operating processes and evaluate the risks. During this time, the QoS of the applications and services is inevitably reduced, or the service is even interrupted, and this also results in considerable time and human costs.

According to the embodiments of the present disclosure, solutions of optimized capacity expanding processes and minimized configuration modifications required are provided to lower the potential failure risks of expanding capacity and simplify the corresponding operations. Generally, in order to avoid frequency modifications to a plurality of devices in different layers during capacity expansion, when the host 102 requests a storage space, the storage manager 104 provides an additional storage capacity, besides the storage capacity actually required by the host 102, so as to meet the potential needs of capacity expansion.

Figure 2:
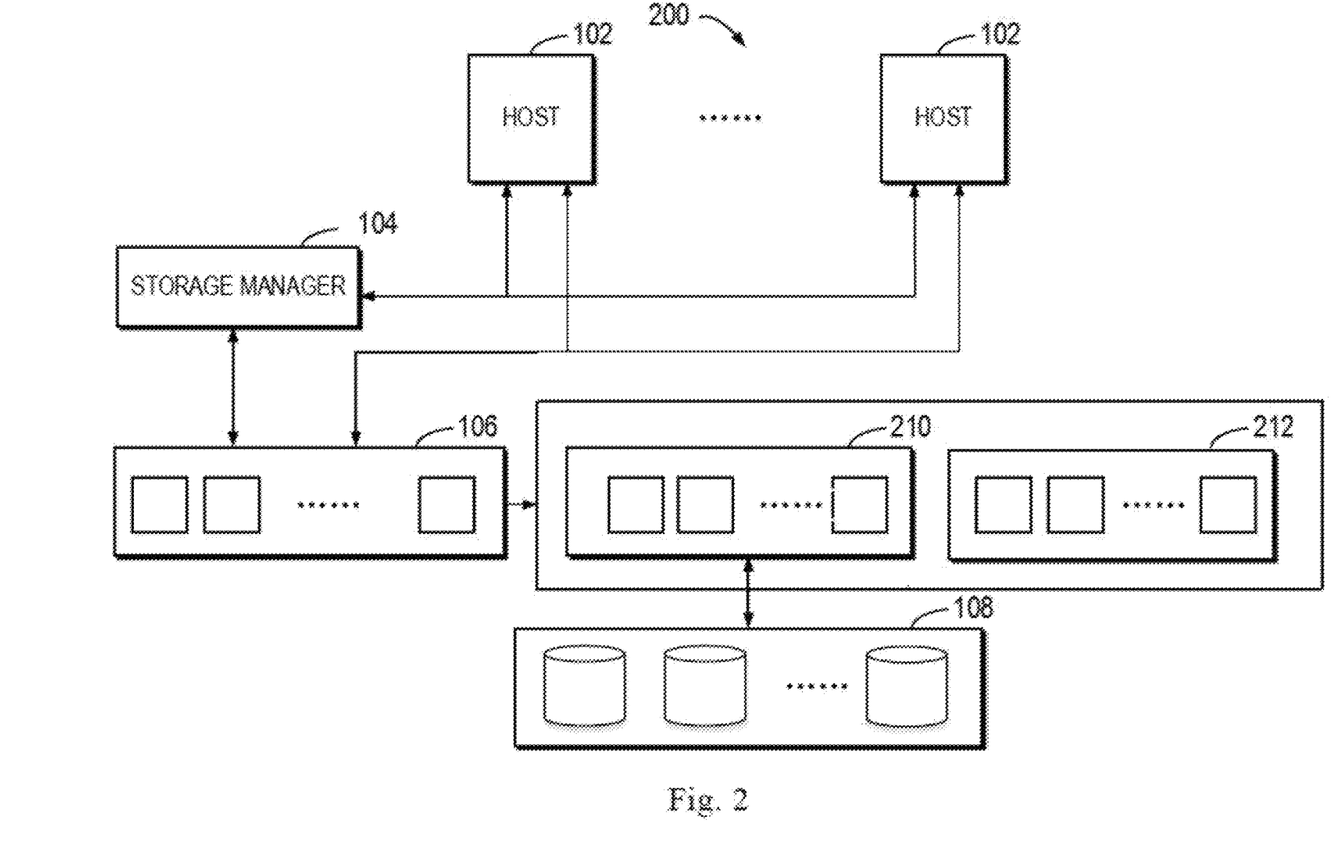
FIG. 2 is a diagram illustrating a storage environment according to an embodiment of the present disclosure.

As shown in FIG. 2, in response to a request for creating a storage space by the host 102, the storage manager 104 allocates two groups of logical units to the host 102. The capacity of the first group of logical units 210 is the capacity expected or requested by the host 102. Additionally, the storage manager 104 allocates a second group of logical units 212 to the host 102, which provides an expansion capacity not currently required but predicted possibly for future use. Particularly, according to an embodiment of the present disclosure, at the creating phase, only the first group of logical units 210 a actually associated with the physical storage 108, while the second group of storage units 212 is not associated with the physical storage 108. That is, the logical units of the capacity currently required by the host 102 are "bound" with the physical storage, while the logical units additionally provided for the host 102 remain "unbound" with the physical storage.

Figure 3:
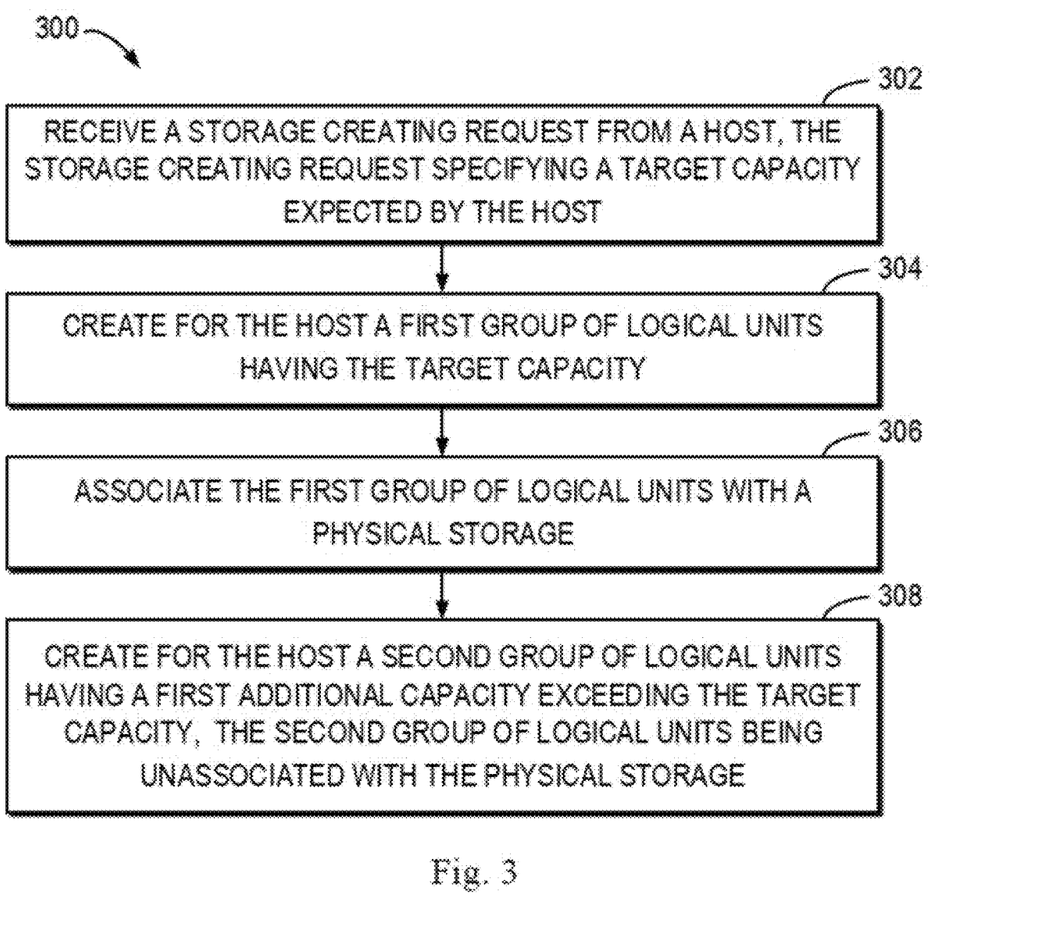
FIG. 3 is a flowchart of a method of storage management according to an embodiment of the present disclosure.

The embodiment shown in FIG. 2 will be described below in connection with FIG. 3. FIG. 3 illustrates a flowchart of a method 300 of storage management: according to an embodiment of the present disclosure. The method 300 as shown in FIG. 3 may be implemented by for example the storage manager 104 as shown in FIG. 2.

At 302, a storage creating request is received from the host 102. The storage creating request specifies a target capacity expected by the host 102. In other words, the target capacity is a capacity actually required by the host at present.

Next, at 304, a first group of logical units 210 having the target capacity is created for the host 102. To this end, based on a size of each logical unit and the target capacity specified in the request at 304, the number of logical units required in the first group of logical units 210 can be determined. Alternatively, in other embodiments, the host 102 may directly specify the number of logical units expected to be used in the creating request. At 306, the first group of logical units 210 is associated with the physical storage 108 for use by the host. In other words, a physical storage space is actually allocated to the first group of logical units 210 at 306, and this portion of physical storage space may be provided to the host for use. The specific implementation relies on specific structures of various physical storage devices 108. In a storage system such as a RAID storage system, the storage resource of the RAID may be associated with metadata of each LUN of the first group of logical units 210.

The method 300 progresses to 308, where a second group of logical units 212 having a first additional capacity exceeding the target capacity is created for the host 102. The size of the additional capacity included in the second group of logical units 212 may be predetermined, may be determined based on an characteristic of the applications running on the host 102, or may be determined based on the historical usage condition of the storage space of the host 102, etc.

According to the embodiments of the present disclosure, as stated above, the second group of logical units 212 created at 308 is not actually associated with the physical storage 108. That is, though the second group of logical units 212 has been allocated from the perspective of the host 102, the second group of logical units 212 does not occupy the real physical storage space, rather being placeholders of the provisioning logical units without waste of the storage capacity. In some embodiments, a data structure, such as a pointer, may be used to record the provisioning of the second group of logical units 212.

It will be noted that, though the operations are described above in a specific order, the operations of 304, 306 and 308 are not necessarily performed following the above particular order. For example, the creating operation, the operations associated with the physical storage, etc., at 304 and 308 may be performed in a multi-task manner or in parallel. Further, prior to the operation of 308, it may be firstly detected whether the host enables the feature of the provisioning logical units, the block 308 is executed if this feature is enabled, otherwise, only the requested logical units, namely the first group of logical units 210, are allocated, and operations thereon are performed without relevant operations of the provisioning logical units.

Figure 4:
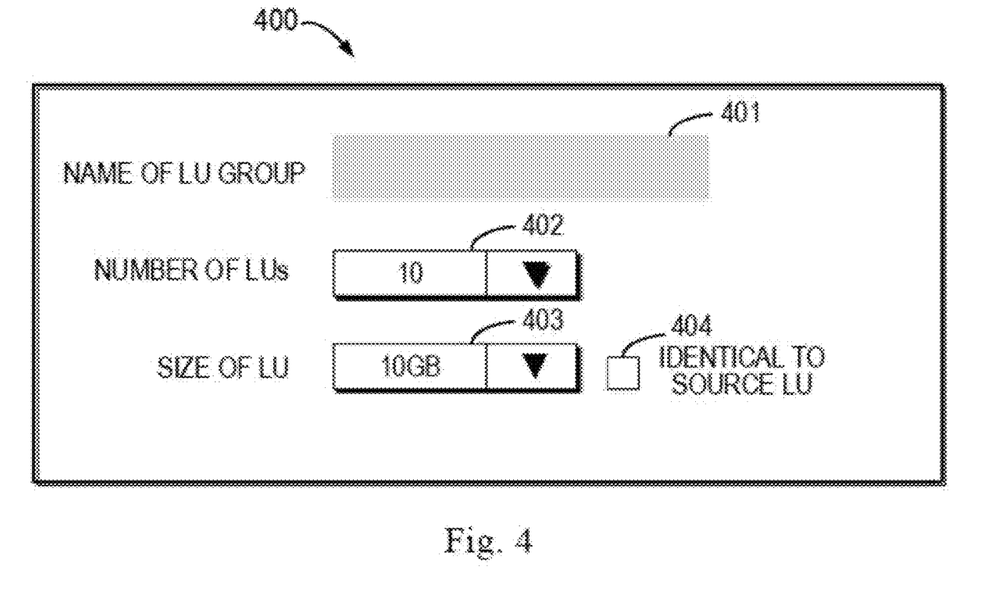
FIG. 4 is a diagram for defining a provisioning logic unit.
Figure 5:
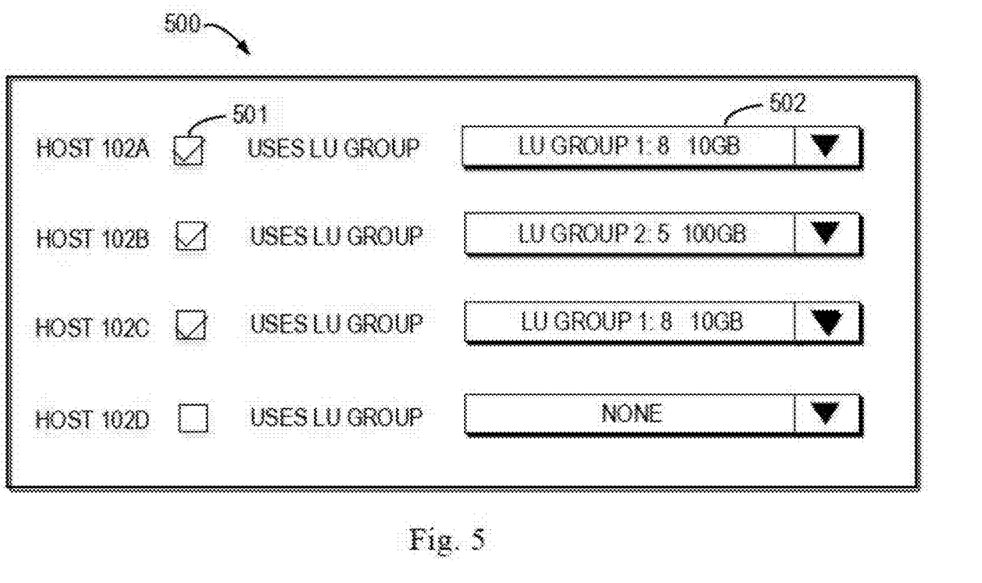
FIG. 5 is a diagram illustrating a provisioning logic unit for configuring a host.

For a user, creating storage of each host may be done through a configuration operation on each host. In one embodiment of the present disclosure, FIGS. 4 and 5 illustrate configuration diagrams. It will be noted that FIGS. 4 and 5 only illustrate configuration operations on the provisioning logical units the second group of logical units 212), and the operations on the group of logical units (i.e., the first group of logical units 210) actually allocated with the physical storage space may be similar or may be remained on the same way of the present implementations. Besides, it will also be noted that, from the perspective of the user, the logical units seen by the host 102 may be represented as volumes corresponding to the logical units or LUNs, and such representation is dependent on an abstract definition of the storage space made by the user in the storage environment. Hence, the logical units operated by the user may have different representation forms without departing from the spirits and nature of the operations on the corresponding logical units in the embodiments of the present disclosure.

FIG. 4 is a diagram of a User Interface (UI) 400 of a group of provisioning logical units defined for the host 102. The user may, based on requirements of the applications running on the host 102, define for each host 102 a group of logical units having a name of the group of logical units (or LU group), sizes of logical units and the number of logical units. The user may also define one or more groups of provisioning logical units for multiple hosts or all hosts. In this case, the user may consider the sizes and the number of the logical units based on potential needs of applications running on multiple hosts or all hosts.

Controls 401, 402 and 403 as shown in FIG. 4 may be used respectively to display and/or select the name of the group of logical units, the number of logical units included in the group of logical units, and the size of each logical unit. In some embodiments, the controls 402 and 403 may be a drop-down menu. In this exemplary embodiment, the user of UI 400 selects a check box 404 "identical to source logical units" to use a size of a first logical unit onto the target host. For example, if the user firstly creates a logical unit of a particular size (e.g. 100 GB) to the host, all the logical units in the group of logical units are all set to have this size.

After defining the group of provisioning logical units, the UI 500 as shown in FIG. 5 is displayed to the user. The user may associate different groups of provisioning logical units with different hosts. Different hosts may share the same group of logical writs, but they have separate LUNs for each. For example, the group of logical units 1 comprises 8 logical units each of which has a particular size (e.g. 10 GB). Considering the applications running on the hosts 102A and 102C are similar, the user may enable the corresponding, check box 501 and perform a selection operation in the corresponding drop-down box 502 to respectively associate the host 102A and the host 102C with the group of logical units 1, such that 8 logical units of a particular size (e.g. 10 GB) are provisioned to the host 102A and the host 102C. In FIG. 5, the user provisions 5 logical units of a particular size (e.g. 100 GB) to the host 102B, which form a group of logical units 2. The user may also disable this feature for the host with no need of capacity expansion, for example, by disabling the corresponding check box 501 of the host 102D, and in this case, the previsioning configuration is not performed on the host 1020, and the operations thereon are the same as before without involving any change.

According to embodiments of the present disclosure, the user configures the first group of logical units 210 and the second group of logical units 212 for example via the UI as shown in FIGS. 4 and 5, as a response, the storage manager 104 is instantly triggered to receive the storage creating request from the host and further performs the method 300 as shown in FIG. 3. In this event, as the user configures the first group of logical units 210 for the host 102, the number of the logical units included in the specified first group of logical writs 210 and the size of each logical unit are configured based on the actual needs of the applications, and the storage manager 104 obtains the expected target capacity of the host 102 based on the configuration information. As the user configures for the host 102 the second group of logical units 212, the number of the logical units included in the specified second group of logical units 212 and the size of each logical units are configured based on the potential needs of the application, and the storage manager 104 obtains a first additional capacity of the host 102 based on the configuration information. In this way, the storage manager 104 creates storage for the host 102.

After done with, creating the logical units as illustrated in the method 300, in an embodiment of the present disclosure, for example in a storage environment 200, the first group of logical units 210 and the second group or logical units 212 are added to the masking of the disk arrays, the zones are created on the fiber channel switch, and the logical units on the host 102 are scanned and mounted. Now, from the perspective of the host 102, all the created logical units can be seen by the host 102, but only the capacity of the first group of the logical units 210 can be used.

Figure 6:
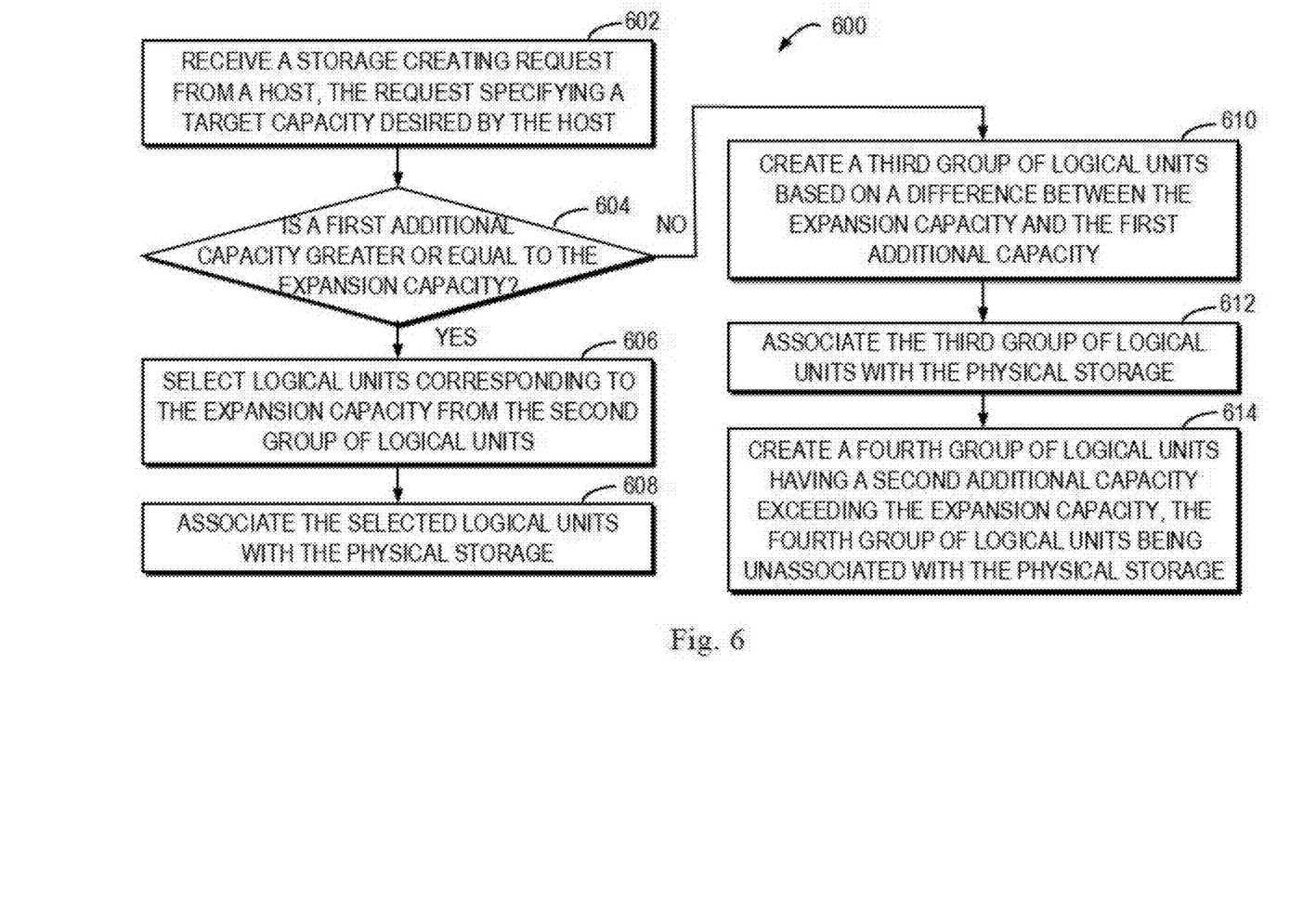
FIG. 6 is a flowchart of a method of expanding a capacity according to an embodiment of the present disclosure.

A storage provisioning mechanism according to the present disclosure only not only satisfy the current actual needs of the host 102 but also facilitate the future storage capacity expansion. Referring to FIG. 6, the operating process as the host desires to expand its storage capacity will be described below. FIG. 6 shows a flowchart of the method 600 of expanding a capacity according to one embodiment of the present disclosure. In some embodiments, the method 600 may also be implemented by the storage manager 104.

At 602, a capacity expanding request is received from the host 102. It will be appreciated that, with the applications running on the host 102, the storage capacity currently allocated to the host 102 may not satisfy the requirements of the host 102. At this point, the Dost 102 may send a capacity expanding request to the storage manager 104. The capacity expanding request at least includes an expansion capacity expected by the host 102. According to the embodiment of the present disclosure, the capacity expansion is implemented based at least partly on the second group of logical units 212 provisioned to the host 102.

Specifically, at 604, it is determined whether the capacity provided by the provisioning second group of logical units 212 (also referred to as "a first additional capacity") can satisfy the expansion requirement. If the first additional capacity is greater than the expansion capacity as indicated in the expanding request (the branch "yes"), the method 600 moves to block 606. At 606, logical units corresponding to the expansion capacity are selected from the second group of logical units 212. Next, at 608, the logical units selected at 606 are associated with the physical storage to complete the capacity expansion. Since these logical units selected for example from the second group of logical units 212 have been provisioned to the host 102 and thus are "visible" to the host 102, they may be directly formatted and the storage capacity thereof may be used accordingly. The remaining unused logical units in the provisioned logical units may still retain an "unbound" state, i.e., not actually occupying the physical storage resource.

On the other hand, if it is determined at 604 that the capacity of the second group of the logical units is not sufficient to satisfy the expansion requirement (the branch "no"), the method 600 moves to block 610, based on a difference between the expansion capacity required by the host 102 and the first additional capacity provided by the second group of logical units, a third group of logical units is created for the host 102. That is, the storage capacity provided by the third group of logical units is equal to the difference between the expansion capacity and the first additional capacity. Thereafter, at 612, the third group of logical units is associated with the physical storage 108 for use by the host 102.

It should be appreciated that, at 612, the third group of logical units may be configured in any appropriate manner to enable the host 102 to use these logical units. Such configuration includes, but is not limited to: adding new logical units to the disk array masking, detecting or modifying zones on the fiber channel switch, rescanning the logical units on the host 102, etc.

Alternatively, in some embodiments, the capacity expanding operations may also be performed in a "provisioning" manner. Specifically, in such embodiments, the method 600 may move to block 614, a fourth croup of logical units is created for the host 102. The fourth group of logical units provides an additional capacity (also referred to as "a second additional capacity") beyond the current required expansion capacity. Similar to the second group of logical units, the fourth group of logical units is not actually associated with the physical storage 108, although they are visible to the host 102. In other words, the fourth group of logical units is also in an "unbound" state. In this way, further expansion for the future may be prepared.

As it can be seen from FIG. 6, if the capacity expansion request can be satisfied with the provisioned logical units, a few steps may be needed to implement the capacity expanding request through the solutions based on the provisioned expansion capacity as described above. Therefore, frequent modifications to the multiple devices in different layers are avoided during capacity expansion, thus eliminating the potential failure possibility and accelerating the entire capacity expansion flow. In addition, before the capacity expansion occurs, the provisioned logical units are only placeholders and do not take the physical storage space, thus no capacity waste is caused. Even if the user does not use the feature of provisioning or the expansion requirement is beyond a setting of the provisioning, the capacity will be expanded in conventional ways, which does not involve any negative impact.

Figure 7:
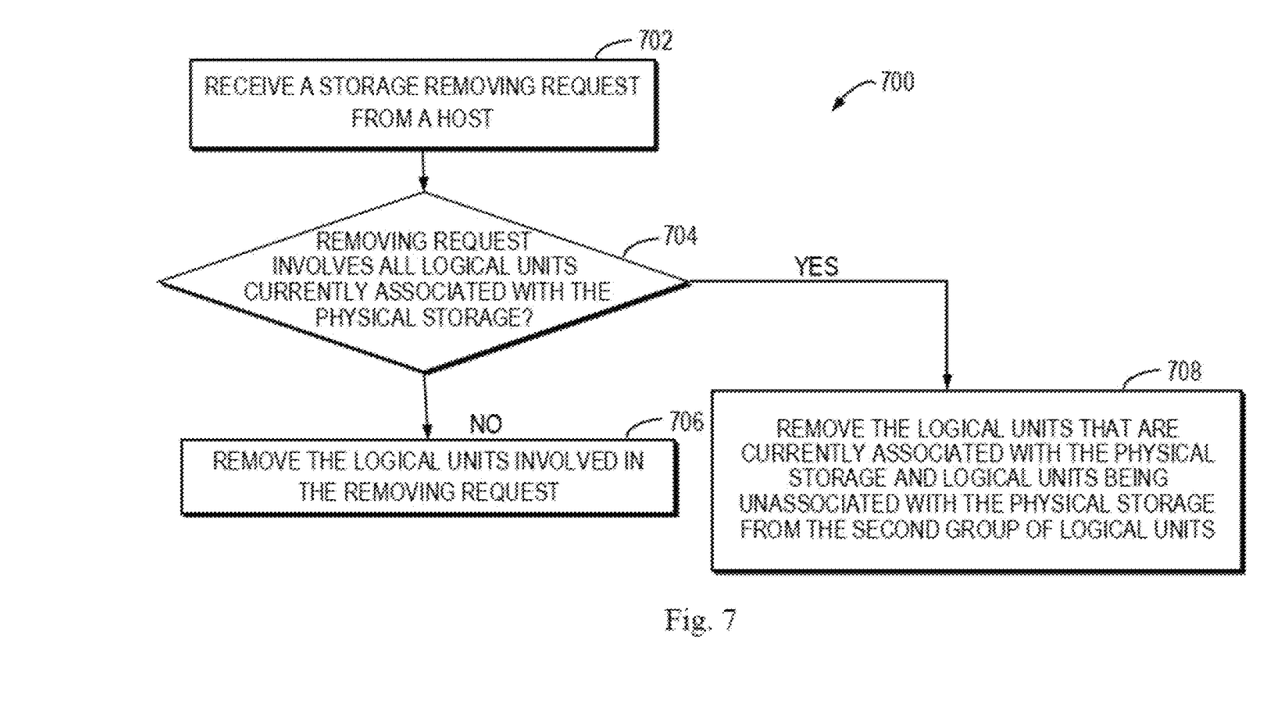
FIG. 7 is a flowchart of a method of removing a capacity according to an embodiment of the present disclosure.

It will be appreciated that, in some cases, as the applications running on the host 102, the applications may not need or may only need a part of the storage capacity actually allocated to the host 102 for use. In this event, the user may desire to remove some logical units in use to avoid capacity waste. Referring to FIG. 7, the operating process as the host desires to remove the capacity will be described below.

FIG. 7 shows a flowchart of a method 700 of removing storage according to one embodiment of the present disclosure. In some embodiments, the method 700 may also be implemented by the storage manager 104. It will be appreciated that, after he storage manager 104 runs for some time, the logical units associated with the physical storage and the logical units not associated with the physical storage may co-exist. The method 700 only illustrates an example embodiment in a case that the host 102 enables the feature of the provisioned logical units, and if the host 102 does not enable this feature, the removing process may be performed in the existing manner.

At 702, a storage removing request is received. At 704, it is determined whether the removing request involves all logical units currently associated with the physical storage 108. If not, this means that the user desires to remove a part of the "bound" logical twins, and the method 700 moves to block 706, where only those logical units involved in the storage removing request are removed. It will be appreciated that, in this case all other logical units associated with the physical storage and the logical units not associated with the physical storage are remained. If the user desires to create new logical units in the future, he can quickly obtain them from those logical units not associated with the physical storage.

On the other hand, if it is determined at 704 that the removing request involves all the logical units currently associated with the physical storage 108 (i.e., it involves the last logical unit associated with the physical storage 108), the method 700 moves to block 708, where not only those logical units involved in the removing request are removed, but also the provisioned logical units having, not been associated with the physical storage yet are removed. These logical units may be from the second group of logical units, and optionally from the fourth group of logical units as described above with reference to FIG. 6.

In one embodiment of the present disclosure, if each logical unit is represented with a single volume, the method 700 may be performed based on the target volumes to be removed by the user's request. Specifically, it may be determined whether the target volume is the last volume "bound" with the physical storage, i.e., whether it corresponds to the last logical unit associated with the physical storage. If yes, this means that the user desires to remove all the "bound" volumes, and the target volume, together with all volumes in an "unbound" state, is removed. Otherwise, only the target volume on the host 102 that the user requests to remove is removed.

Figure 8:
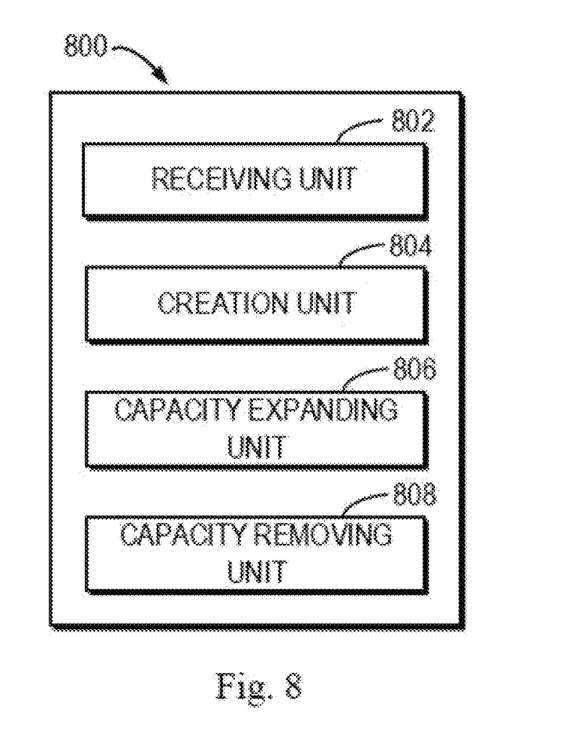
FIG. 8 is a diagram of a storage manager according to an embodiment of the present discourse.

FIG. 8 is an illustrative block diagram of an implementation of the storage manager 104. The storage manager 104 comprises a receiving unit 802 and a creation unit 804. The receiving unit 802 is configured to receive from the host a storage creating request which specifies a target capacity expected by the host The creation unit 804 is configured to create for the host a first group of logical units having a target capacity, the first group of logical units being associated with a physical storage for use by the host, and create for the host a second group of logical units having a first additional capacity exceeding the target capacity, the second group of logical units being unassociated with the physical storage.

According to one embodiment of the present disclosure, the receiving unit 802 of the storage manager 104 is further configured to receive from the host a storage expanding request which specifies an expansion capacity expected by the host. The storage manager 104 further comprises a capacity expanding unit 806 configured to, in response to a storage expanding request, expand an expansion capacity for the host based at least partly on the second group of logical units.

According to one embodiment of the present disclosure, the capacity expanding, twit 806 is further configured to, in response to determining that the first additional capacity is greater than or equal to the expansion capacity, select logical units corresponding to the expansion capacity from the second group of logical units, and associate the selected logical units with the physical storage for use by the host.

According to one embodiment of the present disclosure, the capacity expanding unit 806 is further configured to, in response to determining that the first additional capacity is less than the expansion capacity, create a third group of logical units for the host based on a difference between the expansion capacity and the first additional capacity, and associate the third group of logical units with the physical storage for use by the host.

According to one, embodiment of the present disclosure, the capacity expanding unit 806 is further configured to create for the host a fourth group of logical units having a second additional capacity exceeding the expansion capacity, the fourth group of logical units being unassociated with the physical storage.

According to one embodiment of the present disclosure, the receiving unit 802 of the storage manager 104 is further configured to receive a storage removing request from the host. The storage manager 104 further comprises a capacity removing unit 808 configured to, in response to that the removing request involves all logical units currently associated with the physical storage, remove the logical units that are currently associated with the physical storage, and remove logical units being unassociated with the physical storage from the second group of logical units.

In the embodiment where the storage manager 104 is implemented by the SDS, at least a part of each unit as shown in FIG. 8 may be implemented as a software module. Alternatively, in the embodiment where the storage manager 104 is implemented by hardware, one or more the above units may be implemented as a hardware module, and may include, but be not limited to, an integrated circuit (IC) chip, an application specific integrated circuit (ASIC) chip, a system on chip (SoC), a field program gate array (FPGA), etc.

Figure 9:
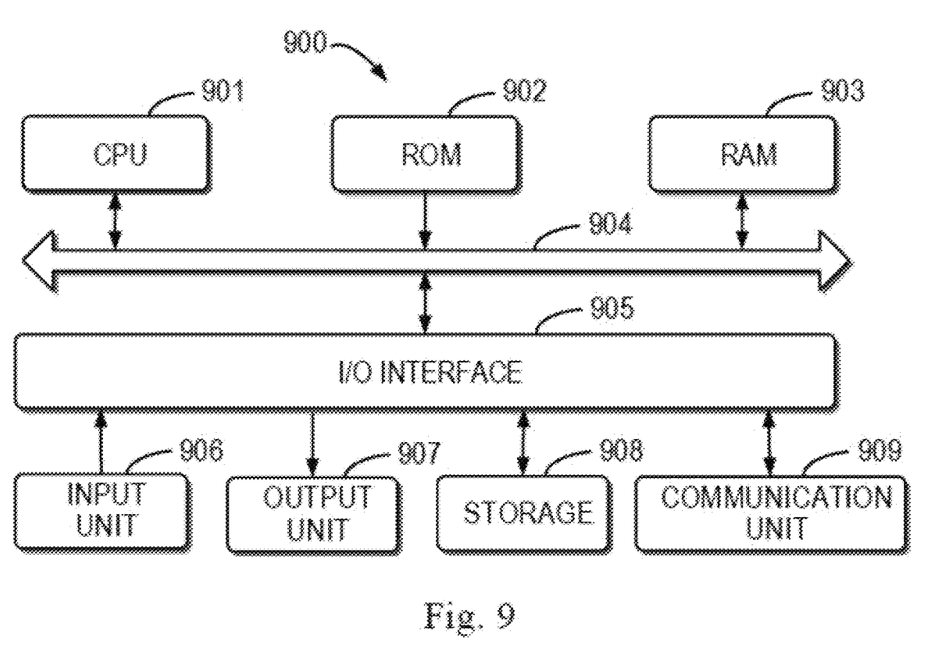
FIG. 9 is a diagram of an apparatus of storage management according to an embodiment of the present disclosure.

FIG. 9 is a schematic diagram of a device 900 according to an embodiment of the present disclosure. The device 900 may act as an apparatus for storage management which for example comprises the storage manager 104 as described above. As shown in FIG. 9, the device 900 comprises a central process unit (CPU) 901 which may execute various appropriate actions and operations based on computer program instructions stored in the read-only memory (ROM) 902 or computer program instructions loaded from a storage unit 908 to a random access memory (RAM) 903. In the RAM 903, various programs and data required by operations of the apparatus 900 may be stored. The CPU 901, ROM 902 and RAM 903 are connected to one another via a bus 904. An input/output (I/O) interface 905 is also connected to the bus 904.

A plurality of components in the device 900 connected to the I/O interface 905 comprises: an input unit 906, such as a keyboard, mouse, etc.; an output unit 907, such as various types of displays, speakers, etc.; a storage 908, such as a disk, CD, etc.; and a communication unit 909, such as a network interface card (NIC), modem, wireless communication transceiver, etc. The communication unit 909 allows the device 900 to communicate information/data with other devices via for example a computer network of Internet and/or various telecommunications networks.

In some embodiments, the processing unit 901 may be configured to execute various processes and operations as described above, such as methods 300, 600 and 700. For example, in some embodiments, the methods 300, 600 and 700 may be implemented as computer software programs which are tangibly included in a machine readable medium, such as a storage unit 908. In some embodiments, the computer programs may be partly or entirely loaded and/or mounted to the device 900 via the ROM 902 and/or the communication unit 909. When the computer programs are loaded to the RAM 903 and executed by the CPU 901, one or more steps of the methods 300, 600 and 700 as described above may be executed.

Through the above description and the teaching given in the relevant drawings, those skilled in the art may recognize many modifications and other embodiments of the present disclosure. Therefore, it will be appreciated that the embodiments of the present disclosure are not limited to the detailed embodiments of the present disclosure, and modifications and other embodiments are intended to be included in the scope of the present disclosure. Moreover, though the above description and relevant drawings describe example embodiments in the background of some exemplary combinations of components and/or functions, it should be noted that different combinations of components and/or functions provided in the alternative embodiments do not depart from the scope of the present disclosure. As for as this concerned, for example, other combinations of components and/or functions somewhat different from the explicit description are also anticipated to be included in the scope of the present disclosure, in spite of specific terms used herein, they only convey general and descriptive meanings and are not intended to limit the present disclosure.

We claim:

1. A method of storage management, comprising:
    receiving a storage creating request from a host, the storage creating request specifying a target capacity expected by the host;
    creating for the host a first group of logical units having the target capacity;
    associating the first group of logical units with a physical storage for use by the host;
    creating for the host a second group of logical units having a first additional capacity exceeding the target capacity, the second group of logical units being unassociated with the physical storage;
    after the first group of logical units and the second group of logical units are created for the host, scanning logical units of the host and mounting the first group of logical units and the second group of logical units to make both the first group of logical units and second group of logical units seen by the host, wherein only the target capacity of the first group of logical units can be used by the host; and
    in response to a removing request received from the host involving all logical units that are currently associated with the physical storage,
        removing the logical units that are currently associated with the physical storage, and
        removing, from the second group of logical units, logical units unassociated with the physical storage.

2. The method according to claim 1, further comprising:
    receiving a storage expanding request from the host, the storage expanding request specifying an expansion capacity expected by the host; and
    in response to the storage expanding request, expanding the expansion capacity for the host based at least partly on the second group of logical units.

3. The method according to claim 2, wherein the expanding comprises:
    in response to determining that the first additional capacity is greater than or equal to the expansion capacity, selecting logical units corresponding to the expansion capacity from the second group of logical units; and
    associating the selected logical units with the physical storage for use by the host.

4. The method according to claim 2, wherein the expanding comprises:
    in response to determining that the first additional capacity is less than the expansion capacity, creating for the host a third group of logical units based on a difference between the expansion capacity and the first additional capacity; and
    associating the third group of logical units with the physical storage for use by the host.

5. The method according to claim 4, wherein the expanding further comprises:
    creating for the host a fourth group of logical units having a second additional capacity exceeding the expansion capacity, the fourth group of logical units being unassociated with the physical storage.

6. The method according to claim 4, further comprising prior to creating for the host the third group of logical units, performing a difference operation to compute the difference between the expansion capacity and the first additional capacity.

7. The method according to claim 1, wherein the physical storage comprises a disk array, and further comprising:
    after the first group of logical units and the second group of logical units are created for the host, adding the first group of logical units and the second group of logical units to masking of the disk array to associate the host with the first group of logical units and the second group of logical units.

8. A device for storage management, comprising:
    at least one processor; and
    at least one memory including computer program codes, the at least one memory and the computer program codes configured to, with the at least one processor, cause the device to perform the following:
        receiving a storage creating request from a host, the storage creating request specifying a target capacity expected by the host;
        creating for the host a first group of logical units having the target capacity;
        associating the first group of logical units with a physical storage for use by the host;
        creating for the host a second group of logical units having a first additional capacity exceeding the target capacity, the second group of logical units being unassociated with the physical storage;
        after the first group of logical units and the second group of logical units are created for the host, scanning logical units of the host and mounting the first group of logical units and the second group of logical units to make both the first group of logical units and second group of logical units seen by the host, wherein only the target capacity of the first group of logical units can be used by the host; and
        in response to a removing request received from the host involving all logical units that are currently associated with the physical storage,
            removing the logical units that are currently associated with the physical storage, and
            removing, from the second group of logical units, logical units unassociated with the physical storage.

9. The device according to claim 8, wherein the at least one memory and the computer program codes are configured to, with the at least one processor, cause the device to further at least perform the following:

receiving a storage expanding request from the host, the storage expanding request specifying an expansion capacity expected by the host; and in response to the storage expanding request, expanding the expansion capacity for the host based at least partly on the second group of logical units.

10. The device according to claim 9, wherein the expanding comprises:

in response to determining that the first additional capacity is greater than or equal to the expansion capacity, selecting logical units corresponding to the expansion capacity from the second group of logical units; and associating the selected logical units with the physical storage for use by the host.

11. The device according to claim 9, wherein the expanding comprises:

in response to determining that the first additional capacity is less than the expansion capacity, creating for the host a third group of logical units based on a difference between the expansion capacity and the first additional capacity; and associating the third group of logical units with the physical storage for use by the host.

12. The device according to claim 11, wherein the expanding further comprises:

creating for the host a fourth group of logical units having a second additional capacity exceeding the expansion capacity, the fourth group of logical units being unassociated with the physical storage.

13. An apparatus for storage management, comprising storage manager circuitry constructed and arranged to:

receive a storage creating request from a host, the storage creating request specifying a target capacity expected by the host;

create for the host a first group of logical units having the target capacity, the first group of logical units being associated with a physical storage for use by the host;

create for the host a second group of logical units having a first additional capacity exceeding the target capacity, the second group of logical units being unassociated with the physical storage;

after the first group of logical units and the second group of logical units are created for the host, scan logical units of the host and mount the first group of logical units and the second group of logical units to make both the first group of logical units and second group of logical units seen by the host, wherein but only the target capacity of the first group of logical units can be used by the host; and in response to a removing request received from the host involving all logical units that are currently associated with the physical storage, remove the logical units that are currently associated with the physical storage, and remove, from the second group of logical units, logical units unassociated with the physical storage.

14. The apparatus according to claim 13, wherein the storage manager circuitry is further constructed and arranged to:

receive a storage expanding request from the host, the storage expanding request specifying an expansion capacity expected by the host; and in response to the storage expanding request, expand the expansion capacity for the host based at least partly on the second group of logical units.

15. The apparatus according to claim 14, wherein the storage manager circuitry is further constructed and arranged to:

in response to determining that the first additional capacity is greater than or equal to the expansion capacity, select logical units corresponding to the expansion capacity from the second group of logical units; and associate the logical units with the physical storage for use by the host.

16. The apparatus according to claim 14, wherein the storage manager circuitry is further constructed and arranged to:

in response to determining that the first additional capacity is less than the expansion capacity, create for the host a third group of logical units based on a difference between the expansion capacity and the first additional capacity; and associate the third group of logical units with the physical storage for use by the host.

17. The apparatus according to claim 16, wherein the storage manager circuitry is further constructed and arranged to:

create for the host a fourth group of logical units having a second additional capacity exceeding the expansion capacity, the fourth group of logical units being unassociated with the physical storage.

* * * * *